May 28, 1968   L. MUNCKE ET AL   3,384,937
LENGTH-CHANGEABLE LINK FOR TRACTOR-IMPLEMENT HITCHES
Filed Nov. 17, 1966
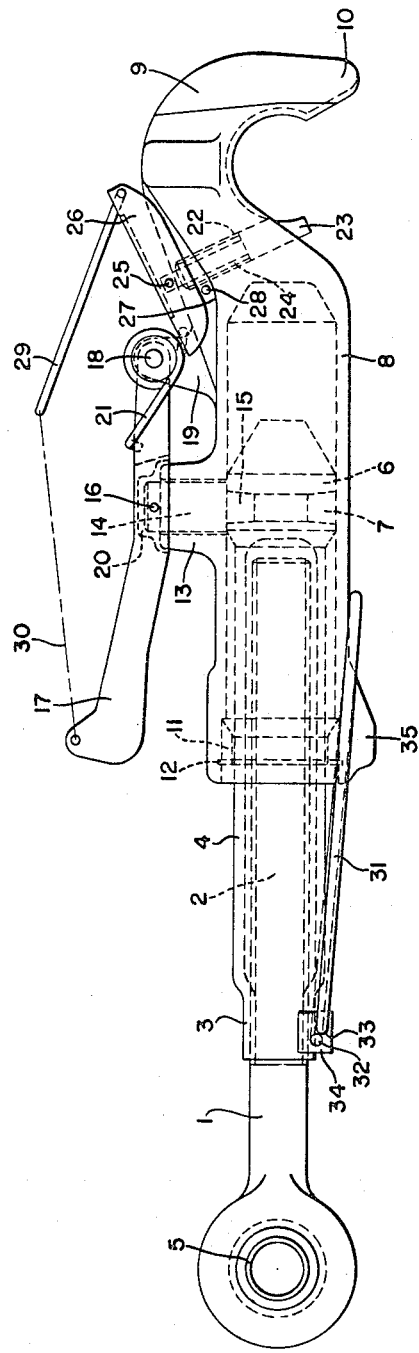
INVENTORS
LUDWIG MUNCKE
FRANZ HEIDJANN

United States Patent Office 3,384,937
Patented May 28, 1968

3,384,937
LENGTH-CHANGEABLE LINK FOR TRACTOR-IMPLEMENT HITCHES
Ludwig Muncke, Morlenbach, and Franz Heidjann, Bruhl-Kierberg, Bezirk Cologne, Germany, assignors to John Deere-Lanz A.G., Mannheim, Germany, and Klockner-Humboldt-Deutz A.G., Cologne-Deutz, Germany, both companies of Germany
Filed Nov. 17, 1966, Ser. No. 619,511
Claims priority, application Germany, Nov. 26, 1965, K 57,747
3 Claims. (Cl. 24—238)

ABSTRACT OF THE DISCLOSURE

A top link for three-point hitches for connecting agricultural implements to tractors, characterized by being easily telescopic to change its length and including in addition a rotative length adjustment feature and suitable locks and actuators therefor for securing a desired length when once selected and for easily releasing the locks to enable length change.

---

This invention relates to tractor-implement hitches, especially of the three-point linkage type, and more particularly to an improved top link which is telescopically extensible and contractable to enable quick and easy coupling and uncoupling of the implement. The top link comprises a pair of elongated members telescopically arranged and each has a connecting element at its free end, one of which is connected to the tractor and the other of which is connectible to and disconnectible from the top hitch point of the implement. The implement connecting element is a hook having a releasable latch. To normally prevent relative telescoping of the members, these members have cooperative lock parts, one of which can be released from the other to permit extension and contraction of the link. The movable lock part and the hook latch are carried by the same member and this member has a pair of actuators for this lock part and latch and these can be actuated simultaneously or independently. In addition, one of the members is made up of two portions coaxially threaded together in the fashion of a turnbuckle so that fine adjustment of the link is possible.

Adjustable top links are known, having parts threaded together, but such a link has the disadvantage that its length cannot be quickly changed according to the relative position of the tractor and implement during hitching, in which situations the distance between the tractor and implement will vary within a relatively wide range because of the varying attitude, level, etc. of the implement. It is also known to provide a top link with a releasable hook and an actuator therefor, but the ability of such link to function efficiently is impaired by the lack of quick length changeability as described above.

It is therefore a principal object of the invention to provide an improved link having releasably interconnected telescopic parts. Other objects are to provide such link with threaded portions for fine adjustment, to provide closely proximate actuators for the telescopic release and for the hook release and to arrange these for selective simultaneous or individual actuation, and to provide simple means for turning the threaded portions relative to each other and to releasably lock this means.

Further objects will appear from the following description and accompanying drawing wherein the single figure is an elevational view of a typical link embodying the invention.

One member of the link has two portions, one of which is a rod-like portion 1 having a threaded end 2 threaded into an internally threaded end 3 of a sleeve 4 that forms the second portion of the member. The end of the portion 1 opposite to its threaded end 2 is a connecting element 5, here an eye with an associated ball connector of the type conventionally used to connect the link to the upper hitch point on the tractor.

The end of the sleeve 4 opposite to its threaded end 3 is closed and is in the form of a head 6 of circular cross section having an annular groove 7 at axially opposite side of which the head is of truncated conical form.

The other member of the link is a tubular part 8 having at its terminal end 9 an integral hook 10 for connection to the upper hitch point of an implement. The whole link is part of a typical three-point linkage that includes a pair of lower links connected between the tractor and lower hitch points on the implement, all of which is a well known arrangement.

The two link members 1–4 and 8 are arranged in coaxial end-to-end relation and are telescopically interconnected by means including the tubular body of the member 8, the head 6 and a bearing and abutment ring or collar 11 retained in the front end of the member 8 by a snap ring 12. When the members 1–4 and 8 are extended, the collar is abutted by the front conical portion of the head 6, and when the member are contracted the opposite conical side of the head 6 abuts the closed interior end of the member 8.

Integrally formed on the member 8 is a boss 13 bored radially as respects the longitdinal axis of the link to slidably receive a lock part 14 having an inner reduced end portion 15 receivable in and retractable from the groove 7 in the head 6, the groove 7 forming a lock part selectively cooperative with the lock part 15. When the two lock parts 7 and 15 are engaged, the link is fixed against relative telescoping. When the two are disengaged, the link can be extended or retracted.

The outer end of the pin 14 is pivotally connected at 16 to an actuator or lever 17 that is in turn fulcrumed on the member 8 by a pin 18 received in a member-carried ear 19. The lever 17 is preferably of inverted U-shaped cross section and has a cup-shaped part 20 overlying the top of the pin 14 and through which the cross pin 16 passes. A torsion spring 21 carried by the fulcrum pin 18 has opposite legs, one engaging the ear 19 and the other engaging the lever 17 to bias the lever in a counterclockwise direction, which in turn biases the inner end 15 of the lock part 14 into engagement with the groove 7 in the head 6.

The connector end 9 of the member 8 has a bore 22 in which is slidably carried a latch 23 biased to its engaging position by a bore-carried spring 24. The reduced outer or upper end of the latch is pivotally connected by a cross pin 25 to an actuator or lever 26 which, being of inverted U-shaped cross section, straddles a rib 27 integral with the member 8. A fulcrum pin 28 extends through this rib and the under edges of the lever 26 ride on this pin as the biasing spring 24 acts against both the lever 26 and the latch 23.

The fulcra 18 and 28 for the levers 17 and 26 respectively are in close proximity to each other and the two levers extend away from each other or in opposite directions lengthwise of the link. Each lever is arranged so that a lifting force will release its associated lock, but the lifting forces must be applied in opposite directions with respect to clockwise and counterclockwise movement. The two levers are shown as being interconnected by flexible means including a loop or bail 29 connected to the lever 26 and a chain 30 connected to this bail as well as to the lever 17.

In making a hitch connection, the operator can release both locks 15 and 23 simultaneously or independently. For example, if the attitude of the implement is such that extension or contraction of the link is unnecessary, the operator may release only the latch 23 to effect the connection of the hook 10 with the implement. If the distance between the top hitch point of the implement cannot be accommodated by the fixed length of the link, the operator can release the lock parts 15–7 so that the hook-up can be accomplished. After the implement is completely hitched, the tractor power lift can be operated to forcibly return the link to its preselected length, it being clear that in returning from either extension or contraction, the conical sides of the head 6 will displace the pin portion 15 until it re-seats in the groove 7.

If desired, one or more pull ropes or the like may be connected to the levers 17 and 26 or to the chain 30 and bail 29 to facilitate operation from the tractor seat.

For the purpose of enabling fine adjustment of the link, as during or preparatory to operation of the hooked-up implement, the member portion 4 may be rotated relative to the portion 1 by means of a handle 31, here in the form of a hairpin spring having elongated legs respectively including end portions 32 and 33 bent toward each other on relatively offset axes and received in similar eccentric or offset bores in an ear 34 rigid on the member portion 4. The eccentricity of the bent portions 32 and 33 causes such bias in the handle that it normally lies closely alongside the portion 4 and the proximate part of the member 8 and lockably straddles a lug 35 on the member 8, whereby the link members are held against relative rotation. The handle may be easily swung out to a position radial to the link axis for accomplishing fine adjustment.

Features and advantages of the invention, other than those enumerated here, as well as modifications in the preferred embodiment illustrated, may be achieved without departure from the spirit and scope of the invention as defined in the appended claims.

What is claimed is:

1. A tractor-implement hitch link of the type including a pair of elongated members arranged in coaxial end-to-end relationship and each having its remote end portion provided with a connector element, one of which elements is a hook having a movable member-mounted latch cooperative with the hook and a first movable member-mounted actuator for operating the latch, the improvement comprising means telescopically interconnecting the members for relative axial extension and contraction, cooperative lock parts respectively on the members, one lock part being movably carried by its member for selective engagement with and disengagement from the other lock part for respectively preventing and enabling relative telescopic movement of the members, a second actuator movably carried on the member having the movable lock part and operatively connected to said movable lock part, and abutment means respectively on the members and interengageable to limit excessive extension and retraction of the members, said actuators being mounted on the same member and in close proximity to each other to facilitate manipulation thereof.

2. The invention defined in claim 1, in which the actuators are interconnected for selective joint and individual operation.

3. The invention defined in claim 1, in which the releasable latch, the movable lock part and both actuators are carried on the same member and each actuator is a lever fulcrumed on said member on closely proximate fulcra and extending away from each other respectively in opposite directions lengthwise of said member.

References Cited

UNITED STATES PATENTS

| | | | |
|---|---|---|---|
| 1,201,175 | 10/1916 | Grunwald | 24—238 |
| 1,654,939 | 1/1928 | Loebs | 280—482 |
| 2,451,698 | 10/1948 | Swinehart | 280—482 |
| 2,619,390 | 11/1952 | Johnson | 24—230.5 |
| 2,667,366 | 1/1954 | Otjen | 280—482 |
| 2,733,935 | 2/1956 | Whiteley | 280—477 |
| 2,760,707 | 8/1956 | Anderson | 24—230.5 |
| 3,053,552 | 9/1962 | Horney | 280—482 |

FOREIGN PATENTS

| | | |
|---|---|---|
| 430,391 | 8/1911 | France. |
| 845,264 | 8/1960 | Great Britain. |

DONALD A. GRIFFIN, *Primary Examiner.*